United States Patent

Cooper et al.

[11] Patent Number: 5,305,133
[45] Date of Patent: Apr. 19, 1994

[54] TWO-WAY OPTICAL COMMUNICATIONS SYSTEM

[75] Inventors: Anthony J. Cooper; Andrew R. Hunwicks; Lawrence Bickers, all of Ipswich, United Kingdom

[73] Assignee: British Telecommunications public limited company, London, England

[21] Appl. No.: 32,195

[22] PCT Filed: Feb. 2, 1990

[86] PCT No.: PCT/GB90/00157

§ 371 Date: Aug. 16, 1991

§ 102(e) Date: Aug. 16, 1991

[87] PCT Pub. No.: WO90/09709

PCT Pub. Date: Aug. 23, 1990

Related U.S. Application Data

[63] Continuation of Ser. No. 743,313, Aug. 16, 1991, abandoned.

[30] Foreign Application Priority Data

Feb. 16, 1989 [GB] United Kingdom ................. 8903568

[51] Int. Cl.⁵ ................. H04B 10/24; H04B 10/00
[52] U.S. Cl. ................. 359/152; 359/145; 359/113
[58] Field of Search ............... 359/113, 152, 154, 158, 359/145, 147, 174, 173

[56] References Cited

U.S. PATENT DOCUMENTS

| | | | |
|---|---|---|---|
| 4,456,793 | 6/1984 | Baker et al. | 359/137 |
| 4,916,460 | 4/1990 | Powell | 359/145 |
| 4,941,207 | 7/1990 | Maeda et al. | 359/172 |
| 5,029,306 | 7/1991 | Ball et al. | 359/152 |

FOREIGN PATENT DOCUMENTS

| | | | |
|---|---|---|---|
| 90/00157 | 2/1989 | PCT Int'l Appl. | |
| 8613060 | 5/1986 | United Kingdom | 359/113 |
| 2222735 | of 1990 | United Kingdom | H04B 9/00 |

OTHER PUBLICATIONS

Patent Abstracts of Japan vol. 10, No. 186 (E–416)(2242) Jun. 28, 1986, & JP-A-61 35031 (Sumitomo Electric Ind. Ltd) Feb. 19, 1986.
Patent Abstracts of Japan vol. 9, No. 85-(E-308) (1808) Apr. 13, 1985, & JP-A-59 216335 (Fujitsu K.K.) Dec. 6, 1984.

*Primary Examiner*—Richard E. Chilcot, Jr.
*Assistant Examiner*—Rafael Barares
*Attorney, Agent, or Firm*—Nixon & Vanderhye

[57] ABSTRACT

An optical communications system comprises a transceiver arranged to provide two-way communication over an optical communications channel (3). The transceiver comprises a semiconductor light source (4) and a detector (5). The semiconductor light source (4) provides optical signals for transmission via the optical communications channel (3), and the detector (5) detects optical signals received via the optical communications channel and converts said optical signals into electrical signals. Means (2, 2a, 2b) are provided for modulating the output of the semiconductor light source (4) wiht an RF carrier having a first frequency. Said electrical signals are passed through filter (8) adapted to filter out signals at said first frequency.

12 Claims, 2 Drawing Sheets

TWO-WAY OPTICAL COMMUNICATIONS SYSTEM

This is a continuation of application Ser. No. 07/743,313, filed Aug. 16, 1991, now abandoned.

BACKGROUND OF THE INVENTION

Field of the Invention

This invention relates to an optical communications system including at least one transceiver arranged to provide two-way communication over an optical communications channel, and to a transceiver for use in such a system.

Description of Related Art

Optical communications systems, generally using silica-based optical fibres for transmission of infrared light in the wavelength range 0.72 to 1.55 μm, are becoming increasingly widely used. Thus far, fibre-based systems have predominantly been used in heavy traffic, trunk telephony applications where the fibres' large bandwidth justifies the expense of the optical terminal equipment.

Whilst optical fibres are increasingly being used in lower traffic applications, in such applications the high cost of transmitters and receivers is a limiting factor. In particular, the high cost of providing optical transmitters and receivers is one of the major obstacles preventing the widespread provision of fibre links to subscribers premises.

Consequently, there exists a need for less expensive equipment for the transmission and reception of optical signals.

Our copending British patent application 8916939.5 relates to an optical communications system including a pair of transceivers interconnected by an optical fibre. Each transceiver is arranged to provide two-way communication over the optical fibre, and each transceiver comprises a semiconductor light source such as a laser and a photodetector. Each laser provides optical signals for transmission via the optical fibre, and each photodetector detects optical signals received via the optical fibre. A respective filter, which is substantially opaque at the operative wavelength of the associated laser, is located between that laser and its photodetector.

This type of transceiver separates the send and receive signals after the incoming signal has passed through the laser. This technique, which is termed "optical feedthrough", enables bi-directional links to be configured without the need for line side components such as couplers, thereby reducing costs and network complexity. Thus, the laser die of a typical laser package can be aligned with a single mode fibre, allowing the transmitted signal to be efficiently coupled. A large area photodetector can be mounted some distance behind the laser to collect and monitor the optical output from the back facet of the laser. An optical signal transmitted into the laser package via the fibre will cause the laser to form part of the received signal path. If the photon energy of the incoming signal is less than the band gap energy of the laser, little absorption occurs, and the light is guided through the laser to be received at the rear-mounted photodetector. Conversely, if the incoming signal has a photon energy greater than the band gap of the laser, absorption would be expected to take place. However, it has been found that, even in this second case (for example for 1300 nm light passing through a 1550 nm laser), significant levels of incoming signal are present at the photodetector. This effect is due to the incoming signal "by-passing" the laser die, the level of signal received being related to the physical geometry of the transceiver package and the divergent nature of the light exiting the fibre. If the level of incoming signal detected by the photodetector is of sufficient optical power this component can be used to create an integral receiver.

It will be appreciated that there will be large levels of crosstalk present at the photodetectors due to the close proximity of the lasers. The method of avoiding unacceptable crosstalk described in the specification of our corresponding British patent application 8916939.5 is to operate in a WDM mode, the two transceivers having different wavelengths, with optical band pass filters being placed between lasers and their photodetectors.

The introduction of optical band pass filters between the lasers and photodetectors separates the send and receive signals, so that a bi-directional link can be established. However, a constant current source is necessary to bias the laser diodes, as automatic power control (APC) is no longer available due to the removal of the back facet monitor diode from the APC circuit.

Although this system provides a bi-directional link without the need for line side components, it does have a number of disadvantages, namely:

SUMMARY OF THE INVENTION i) Two different transceiver modules are required, one operating at 1300 nm and one at 1550 nm;
ii) Optical loss in the 1550 nm transceiver is high (21 dB);
iii) Optical filters with high isolation are necessary to prevent crosstalk; and
iv) Owing to the removal of the back facet monitor diode from the APC circuit, means power control is no longer available by usual means.

The aim of the invention is to provide an optical communications system which does not suffer from these disadvantages.

The present invention provides an optical communications system comprising a transceiver arranged to provide two-way communication over an optical communications channel, the transceiver comprising a semiconductor light source, a detector and a filter, the semiconductor light source and the detector being aligned with the optical communications channel, the semiconductor light source providing optical signals for transmission via the optical communications channel, and the detector detecting optical signals received via the optical communications channel and converting said optical signals into electrical signals, wherein means are provided for modulating the output of the semiconductor light source with an RF carrier having a first frequency, and wherein said electrical signals are passed through the filter which is such as to filter out signals at said first frequency.

In a preferred embodiment, the system comprises first and second transceivers which are arranged at opposite ends of the optical communications channel, each transceiver comprising a semiconductor light source, a detector and a filter, the semiconductor light source and the detector of each transceiver being aligned with the optical communications channel, the first transceiver being provided with means for modulating the output of its semiconductor light source with an RF carrier at said first frequency, and the second transceiver being provided with means for modulating the output of its semiconductor light source with an RF carrier having a second frequency, the filter of the first transceiver being arranged to pass signals within a band centred on the second frequency, and the filter of the second transceiver being arranged to pass signals in a band centred on the first frequency. In this case, the RF carriers constitute analogue sub-carriers for the optical signals transmitted along the optical communications channel.

Advantageously, each of the semiconductor light sources is a laser operating at 780 nm. Preferably, the first frequency is 47 MHz, the second frequency is 1.7 MHz, the filter of the first transceiver is a third order low pass Butterworth filter with a three dB band edge of 5 MHz, and the filter of the second transceiver is a third order band pass Chebychev filter with a pass band of 5 MHz centred on 47 MHz. The first and second frequencies may be provided by the carrier frequencies of a cordless telephone link.

An optical fibre (preferably single mode) may constitute the optical communications channel.

BRIEF DESCRIPTION OF THE DRAWINGS

A bi-directional optical communications system constructed in accordance with the invention will now be described in greater detail, by way of example, with reference to the accompanying drawings, in which.

DETAILED DESCRIPTION OF EXEMPLARY EMBODIMENTS

Figure 1:
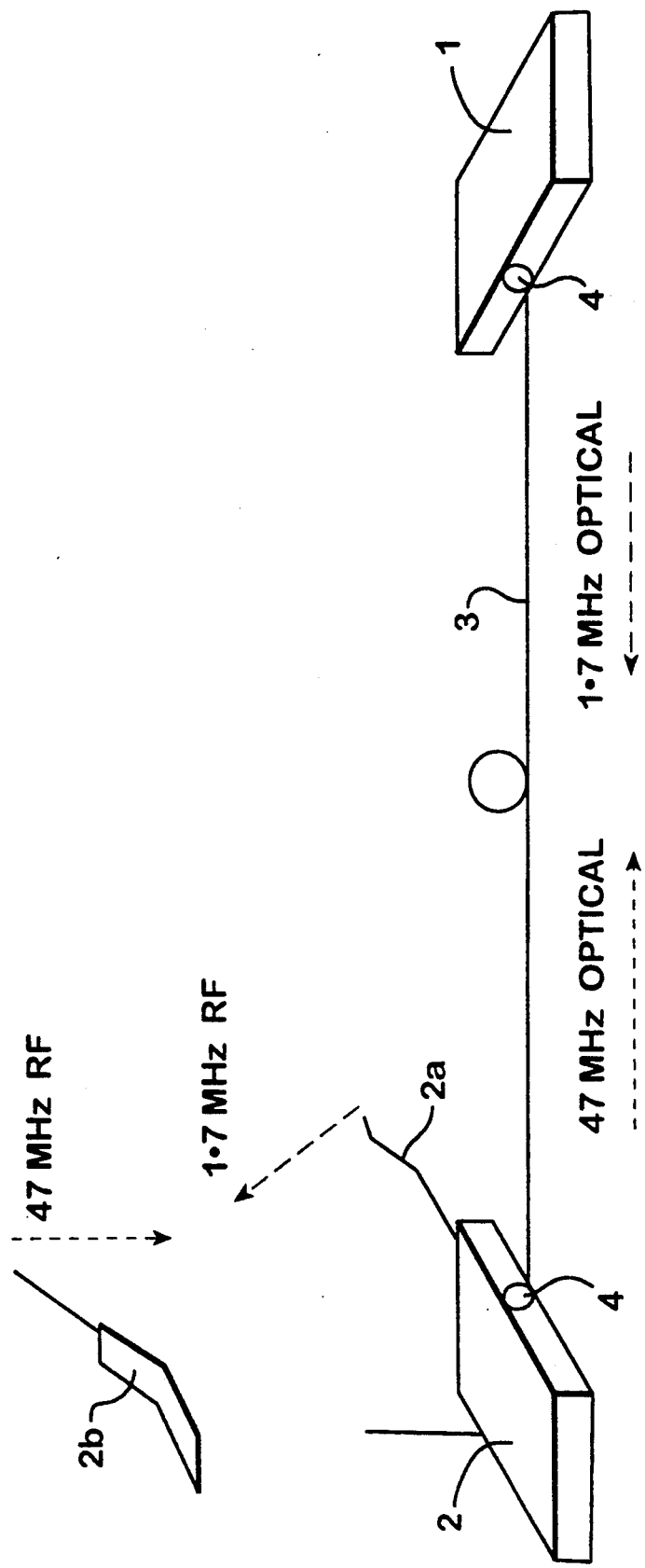
FIG. 1 is a schematic diagram of the bi-directional optical communications system.

Referring to the drawings, FIG. 1 shows a bi-directional optical communications system comprising a base station 1 connected to a relay station 2 by a single mode optical fibre 3. The base station 1 is situated in a local exchange (not shown) and the relay station is situated in a customer's premises (not shown). The base station 1 and the relay station 2 each contain a compact disc (CD) laser 4 packaged in a ferrule connector (fc) receptacle (not shown). The lasers 4 operate at 780 nm, and the use of the single mode optical fibre 3 at this wavelength results in high attenuation and modal noise, since the fibre cut off is in the 1100 nm region. Each laser 4 forms part of a transceiver which receives and sends optical signals along the optical fibre 3, and which converts the optical signals to electrical signals.

Figure 2:
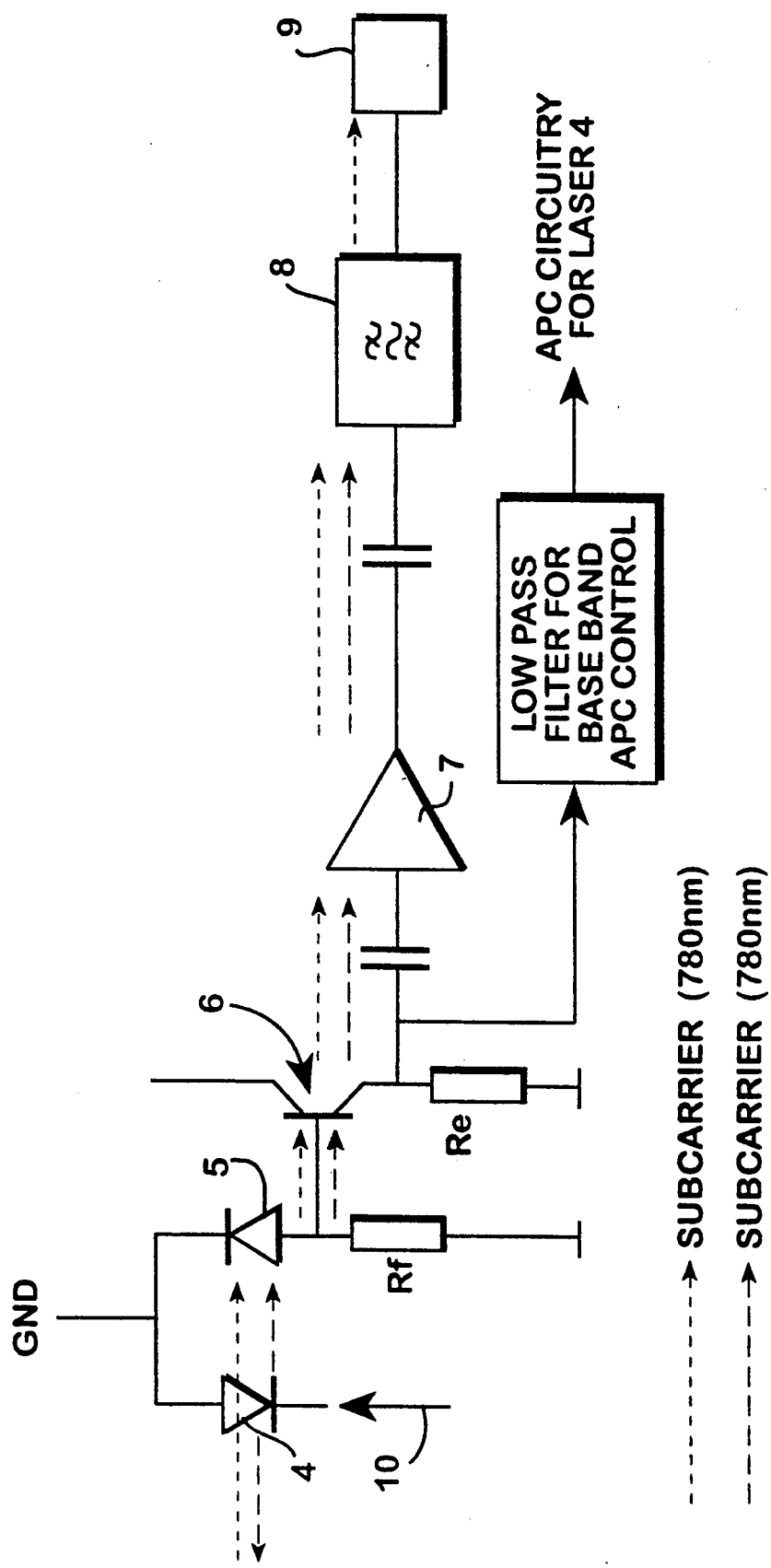
FIG. 2 is a schematic diagram of one of the transceivers of the system of FIG. 1.

FIG. 2 is a schematic diagram showing the transceiver associated with the relay station 2. The transceiver includes a photodetector 5, such as a Plessey PIN photodiode type P35-2600, aligned with the laser's active region, and hence with the core of the optical fibre 3. The output of the photodetector 5 is fed via a transistor 6 (which acts as an impedance converter), an amplifier 7, and a filter 8 to an output 9. The output 9 is fed to the electronics (not shown) of the relay station 2, this electronics including an amplifier for driving an aerial 2a (see FIG. 1) for transmitting an RF signal to a cordless telephone handset 2b. The RF signal from the relay station 2 to the handset 2b is at 1.7 MHz, and the RF signal from the handset to the relay station is at 47 MHz. The cordless telephone system thus provides two FM speech channels, on carrier frequencies of 47 MHz and 1.7 MHz. Acceptable speech quality is achievable with a CNR (carrier-to-noise ratio) of 17 dB over the link between the handset 2b and the base station 1. The allowable optical loss budget is also dependent upon the free space loss over the radio link.

As the lasers 4 transmit at the same wavelength, crosstalk will be present at the photodetectors 5. This crosstalk can be removed, according to the invention, by modulating the lasers 4 with separate analogue sub-carriers for each direction of transmission, and then by post-detection electrical filtering. Thus, at the transceiver shown in FIG. 2, the laser 4 is modulated by the carrier frequency of 47 MHz provided by the transmission signals from the handset 2b, this carrier frequency being applied directly, as indicated by the arrow 10, to the laser to modulate the output thereof. The laser output is, therefore, modulated on an analogue sub-carrier frequency of 47 MHz. Similarly, the laser 4 of the base station is modulated on an analogue sub-carrier frequency of 1.7 MHz, by applying the other carrier frequency (1.7 MHz) of the cordless telephone link directly to that laser. Crosstalk is removed in each transceiver by electrical filtering. Thus, the filter 8 of FIG. 2 is a third order low pass Butterworth filter with a 3 dB band edge of 5 MHz, and the filter of the transceiver in the base station 1 is a third order band pass Chebychev filter with a pass band of 5 MHz centred on 47 MHz. For the Chebychev filter, out of band rejection is in excess of 30 cB 8 MHz from the centre frequency. The electrical filters 8 thus ensure frequency separation between the two speech channels. As the transmitted information in this system is contained within two discrete frequency channels, and does not extend to base-band, low pass filtering can provide a DC control signal for use by the existing APC circuitry. The photodetectors 5 can, therefore, be used for mean power control of the lasers 4.

For this system, theoretical receiver sensitivities of −52 dBm were calculated when operating with a feedthrough laser launch power of −13 dBm. It should be noted that receiver sensitivities must be calculated for a specific feedthrough laser launch power, since this presents the dominant noise source (laser launch power was restricted to less than −13 dBm to avoid saturation of the front end amplifier).

With the free space path restricted as previously mentioned, received power levels of −28.9 dBm and −29.2 dBm (CNR=17 dB) were measured for the 1.7 and 47 Mhz links respectively. Feedthrough attenuation was measured at 21 dB, giving overall receiver sensitivities of −50.0 dBm and −50.0 dBm. Hence an optical power budget of 16 dB was obtained; sufficient for a 4 km link with a 4.0 dB margin. These results are summarised in the table below:

| Subcarrier system power budget. | | |
|---|---|---|
| Launch power (dBm) | −13 | −31 |
| Losses (dB) 4 km fibre (780 nm) | 12 | 12 |
| Feedthrough | 21 | 21 |
| | — | — |
| | 33 | 33 |
| Receiver power (dBm) | −46 | −46 |
| Receiver sensitivity (dBm) | −50.0 | −50.0 |
| System margin (dB) | 4.0 | 4.0 |

It will be apparent that the system described above could be modified in a number of ways. For example, upgrading the system of 1300 nm operation would improve the optical link length to 35 km, (assuming a 16 dB optical power budget and an attenuation of about 0.4 dB/km at 1300 nm. The exact optical loss budget, however, is dependent on the performance of the photodetectors 5 and the feedthrough loss at 1300 nm. A significant improvement could also be achieved if the photodetectors 5 are high performance PINs, with low capacitance and dark current.

We claim:

1. An optical communications system comprising a transceiver arranged to provide two-way communication over an optical communications channel, the transceiver comprising:
    a semiconductor light source,
    an optical signal-to-electrical signal detector, and
    an electrical signal frequency selective filter,
    the semiconductor light source and the detector being optically and physically aligned with each other and with the optical communications channel such that light from the communications channel passes through the light source and onto the detector together with light generated by the source which also acts on the detector,
    the semiconductor light source providing optical signals for transmission via the optical communications channel, and
    the detector detecting optical signals both as transmitted by the source and as received via the optical communications channel through the source and converting said optical signals into electrical signals,
    wherein means are provided for modulating the output of the semiconductor light source with an RF carrier having a first frequency, and
    wherein said electrical signals are passed through the filter which filters out signals at said first frequency.

2. A system as in claim 1, wherein the system comprises first and second transceivers which are arranged at opposite ends of the optical communications channel, each transceiver comprising:
    a semiconductor light source,
    a detector, and
    a filter,
    the semiconductor light source and the detector of each transceiver bing optically aligned with each other and with the optical communications channel,
    wherein the first transceiver is provided with means for modulating the output of its semiconductor light source with an RF carrier at said first frequency, and
    wherein the second transceiver is provided with means for modulating the output of its semiconductor light source with an RF carrier having a second frequency,
    the filter of the first transceiver being arranged to pass signals within a band centred on the second frequency, and
    the filter of the second transceiver being arranged to pass signals in a band centred on the first frequency.

3. A system as in claim 2, wherein each of the semiconductor light sources comprises a laser operating at 780 nm.

4. A system as in claim 2, wherein the first frequency is approximately 47 MHz and the second frequency is approximately 1.7 MHz.

5. A system as in claim 4, wherein:
    the filter of the first transceiver comprises a third order low pass Butterworth filter with a three dB band edge of 5 MHz, and
    the filter of the second transceiver comprises a third order band pass Chebychev filter with a pass band of 5 MHz centred on 47 MHz.

6. A system as in claim 4, wherein the first and second frequencies are provided by the carrier frequencies of a cordless telephone link.

7. A system as in claim 1, wherein an optical fibre constitutes the optical communications channel.

8. A system as in claim 7, wherein the optical fibre is a single mode optical fibre.

9. An optical signal transceiver system including a first transceiver comprising:
    an optical fibre input/output port connectable to receive optical signals having information modulated on a carrier frequency f2;
    an optical signal source optically coupled to said input/output port and electrically modulated with first information on a first carrier frequency f1 for transmitting via said fibre optical signals having information modulated on said carreir frequency f1;
    an optical signal detector optically coupled to said input/output port through said optical signal source so as to detect both signals generated by the source and signals received via the optical fibre input/output port through the source and providing composite electrical signals including both (a) said first information modulated on said first carrier frequency f1 and (b) second information received via said input/output port modulated on a second carrier frequency f2; and
    an electrical signal frequency-selective filter coupled to receive said composite electrical signals and to output frequency-filtered signals representing said second information modulated on said second carrier frequency f2 while substantially rejecting and not outputting signals representing said first information modulated on said first carrier frequency f1.

10. An optical signal transceiver system as in claim 9 further including a second transceiver comprising:
    an optical fibre input/output port;
    an optical signal source optically coupled to said input/output port and electrically modulated with said second information on said second carrier frequency f2;
    an optical signal detector optically coupled to said input/output port through said optical signal source and providing composite electrical signals including both (a) said second information modulated on said second carrier frequency f2 and (b) said first information received via said input/output port modulated on said first carrier frequency f1; and
    an electrical signal frequency-selective filter coupled to receive said composite electrical signals and to output frequency-filtered signals representing said first information modulated on said first carrier frequency f1 while substnatially rejecting and not outputting signals representing said second information modulated on said second carrier frequency f2.

11. An optical signal transceiver system as in claim 9 including:
    a low pass filter connected to receive at least a portion of said composite electrical signal and to produce automatic power control signal for use in controlling the electrical operating bias supplied to said optical signal source.

12. An optical signal transceiver system having plural transceivers optically coupled via an optical fibre, each of said transceivers comprising:
an optical fibre input/output port for optical coupling to said optical fibre;
an optical signal source optically coupled to said input/output port and electrically modulated with information on a carrier frequency;
an optical signal detector optically coupled to said input/output port through said optical signal source so as to detect both signals generated by the source and signals received via the optical fibre input/output port through the source and providing composite electrical signals representing different information modulated on different respective carrier frequencies representing information both being received and being transmitted; and
a frequency-selective electrical signal filter coupled to receive said composite electrical signals.

* * * * *